May 22, 1928.  1,670,544
J. F. MAHLSTEDT
ORCHARD HEATER
Filed Nov. 8, 1926
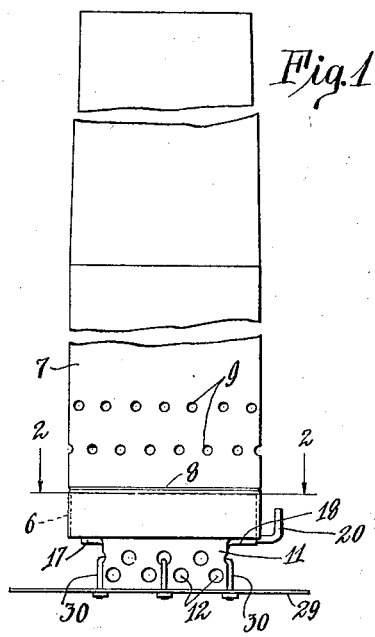
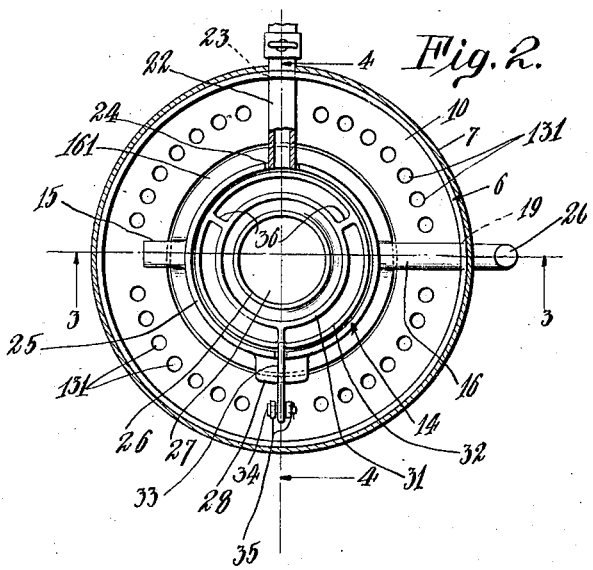
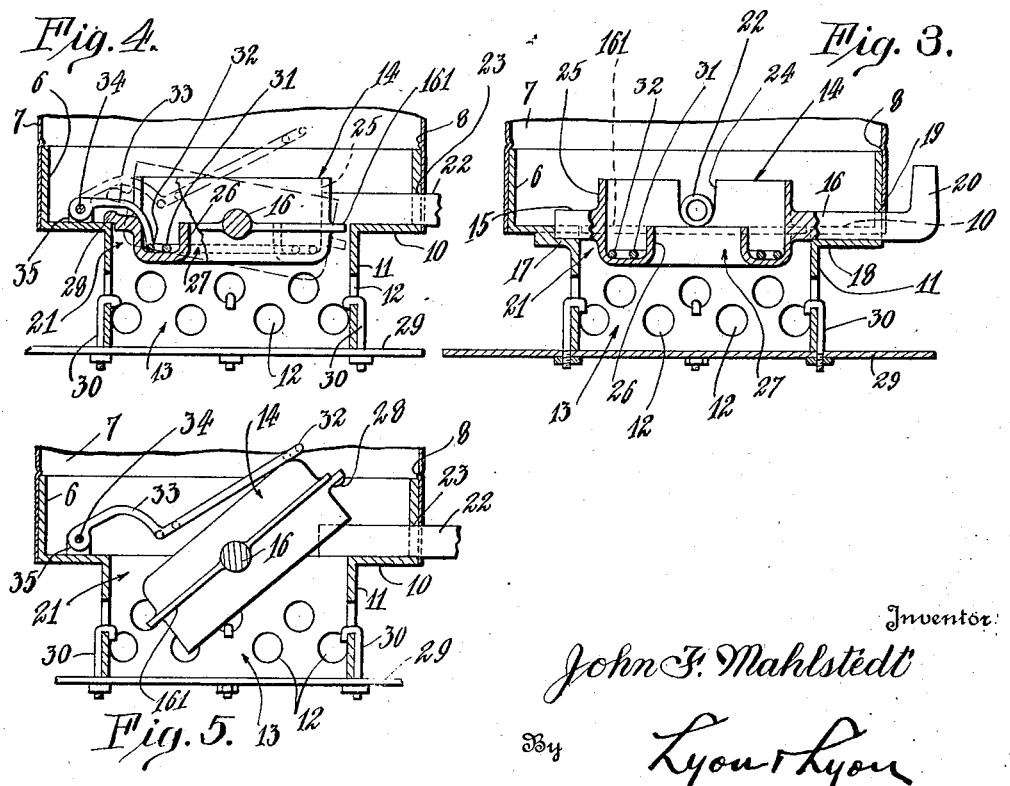
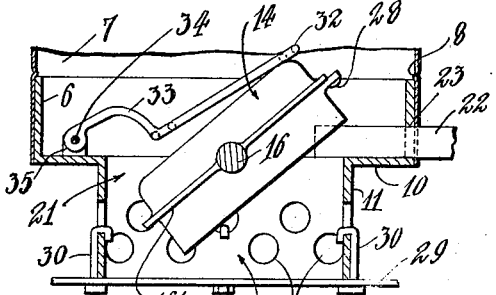
Inventor:
John F. Mahlstedt
By Lyon & Lyon
Attorneys Patented May 22, 1928.

1,670,544

UNITED STATES PATENT OFFICE.

JOHN F. MAHLSTEDT, OF LOS ANGELES, CALIFORNIA.

ORCHARD HEATER.

Application filed November 8, 1926. Serial No. 146,947.

This invention relates to orchard heaters of the type designed to burn a relatively heavy oil, and one of the principal objects of the invention is to provide a construction which will minimize smoking under the normal conditions under which the heater operates in an orchard.

When relatively heavy oil is employed in the ordinary pot-type of orchard heater, a heavy residuum is left which, when the heater is cold, is very difficult to clean out of the heater so as to place it in good condition for future use. This residuum consists largely of asphaltum. The asphaltum, when hot.
will flow very readily and to take advantage of this, I have provided a tilting burner pan.

Another important object is to prevent rain or other moisture lodging in the burner pan when said pan is not in use, and this object is also accomplished by the provision of a tilting pan.

A portion of the residuum, that results when burning heavy asphaltum-containing oils, is of such a nature as to float on the surface of the burning oil and form a hard crust that bridges over the burner pan. The bridging crust is not disposed of, even by tilting the pan and emptying the fluid contents therefrom and, accordingly, a further important object of this invention is to make provision for breaking the crust away from the pan so that the materials, of which the crust is formed, can be readily disposed of.

A further object is to effect the breaking of the crust automatically, by means that are actuated by the tilting of the burner pan.

Another important object is to provide a construction which will facilitate the flowing of air into a chamber beneath the burner pan, thence upwardly through said burner pan, so as to provide air within the column of gases as they issue from the burner pan.

A still further objects is to provide a construction that will facilitate the discharge, from the burner pan, of the heavier constituents of the oil that are incombustible under the conditions present in an orchard heater of this type.

Other objects and advantages will appear in the sub-joined detailed description.

The accompanying drawings illustrate the invention:

Figure 1 is a side elevation of an orchard heater, constructed in accordance with the provisions of this invention, portions of the stack being broken away to contract the view.

Figure 2 is an enlarged transverse section, on the line indicated by 2—2, Figure 1.

Figure 3 is a sectional elevation, on the line indicated by 3—3, Figure 2, the burner pan being shown in the position that it occupies when the heater is in operation.

Figure 4 is a sectional elevation, on the line indicated by 4—4, Figure 2, the burner pan being shown in solid lines in the same position as in Figure 3, and being shown in broken lines in a slightly tilted position.

Figure 5 is a sectional elevation, similar to Figure 4, excepting that the burner pan is in an inverted position with the crust-breaking member resting upon the bottom of the said pan.

There is provided a combustion chamber of any suitable construction and, in this instance, said chamber is of sectional construction and comprises a bottom forming section 6, with an upper or stack section 7, which fits over the section 6. The section 7 is provided with an inwardly projecting bead 8 which, resting upon the rim of the section 6, supports the stack section 7 in proper position. Preferably the stack section 7 is provided, in its lower portion, with a number of air admission ports 9.

Section 6 is provided with an inwardly extending flange 10, which terminates, at its inner edge, in a reduced cylindrical portion 11, that constitutes a means for supporting the flange 10 at a distance above the surface of the earth. Air passages 12 are provided in the supporting means 11 so as to admit air to the space 13 beneath the burner pan 14, which is pivotally mounted within the combustion chamber section 6. Air is admitted to the combustion chamber around the burner pan through ports 131 in the flange 10.

The pivots of the pan 14 are indicated at 15, 16, and said pivots rest in half-round bearings 17, 18, respectively. The pivot 16 is sufficiently long to project through an opening 19 in one side of the combustion chamber, and on the projecting outer end of the pivot 16 is a handle 20, by which said pivot may be turned so as to effect tilting of the burner pan into different positions. A horizontal position of the burner pan is shown in Figure 3, an inverted tilted position is shown in Figure 5 and in Figure 4 a horizontal position is shown in solid lines and a slightly tilted position is indicated in broken lnes.

The flange 10 surrounds the opening 21, in which the pan is suspended by the pivots 15, 16 and said opening is of but slightly larger diameter than the pan 14 so as to prevent the passage of any material amount of air from the space 13 into the combustion chamber around the pan. An annular flange 161 on the periphery of the pan wall 25 serves to close the space between the pan and the flange 10.

The pan 14 may be of any suitable construction for holding the oil that is to be burned, and it receives this oil through a tube 22 which enters the combustion chamber through an opening 23 in one side thereof. In this particular instance, the tube 23 is positioned substantially at right angles to pivots 15, 16. The tube 22 extends into an opening 24 in the outer circular wall 25 of the pan 14. In this instance, the opening 24 is in the form of a notch that opens through the rim of wall 25, thus permitting the tilting of the pan without the necessity of removing the tube 23. Besides having the outer wall 25, the pan 14 is provided with an inner circular wall 26, thus making the pan annular in shape, and providing, through the middle portion thereof, a passage 27 for air, so that air may pass from the space 13 through the pan.

When the pan is in horizontal position, a shoulder 28 on one side of the pan seats on the flange 10 so as to prevent tilting of the pan in one direction. In order to tend to hold the pan horizontal with the shoulder 28 seated, the pivots 15, 16 are placed, preferably, in a plane that is eccentric to the axis of the pan, the distance of said plane from said shoulder being greater than is the distance of the axis of the pan from the shoulder 28, thus over-balancing the pan on the side provided with the shoulder.

The supporting means 11 rests upon a base 29 and may be secured to said base in any suitable manner. In this particular instance, hook bolts 30 are hooked into some of the openings 12 and extend through the base 29. In this instance, the base 29 is flat and may be made of sheet or plate material. The base 29 is designed to rest upon the earth.

The rim of the inner wall 26 of the pan 14 is, preferably, at a lower level than the rim of the wall 25 when the pan is upright, as in Fig. 3, and is also, preferably, at a slightly lower level than the bottom of the inner surface of the tube 23, so that the relatively heavy non-burning constituents of the oil, as they float upon the surface of the burning oil, will discharge over the rim of the wall 26 into and through the opening 27.

There is provided within the pan 14 a suitable means for breaking the crust that generally forms during the burning of the heavier grades of oil, said crust being formed by certain constituents of the oil that float on the surface of the burning oil and do not discharge through the opening 27. This crust is of a britle character and is more or less difficult to break up, but, when hot, and when the fire is first extinguished, the crust breaks very readily. The crust-breaking means is constructed, in this instance, as follows:

One or more annular members 31, 32, of a size to be received in the space between the pan walls 25, 26, are provided with an arm 33 and this arm is pivoted at 34 to ears 35, extending up from the flange 10. The members 31, 32 are of a size and are so positioned that when the pan is upright in horizontal position, said members will lie on the bottom of the pan and, when the pan is tilted slightly, as indicated in broken lines in Fig. 4, the rim of the pan wall 25 engages the arm 33 and causes said arm to be swung upwardly into the dotted position indicated in Fig. 4, thus causing the members 31, 32 to break through any crust that may have formed, as mentioned above.

The orchard heater operates as follows:

Oil will be supplied to the tube 23, preferably so regulated as to provide for a certain desired consumption of oil per hour, and a uniform pressure may be maintained by employing a suitable float chamber between the oil reservoir and the tube 23. The burner pan will first, preferably, be supplied with a light gravity oil and said oil will be ignited, then the heavier grade of oil will be supplied through the tube 23, and said heavier oil will substantially fill the pan to approximately the level of the rim of the inner wall 26. The vapors and gases rise from the pan in a tubular column and said column is surrounded, at its periphery, by air that passes through the ports 131 into the combustion chamber around the periphery of the outer pan wall 25. At the same time, the air passes from the space 13 through the opening 27 into the interior of the column of vapors and gases, thus materially augmenting the supply of oxygen to the hot vapors and gases, thereby producing a relatively smokeless flame, which passes upwardly through the stack so as to heat said stack and the surrounding atmosphere.

When it is desired to extinguish the fire, the supply of oil to the tube 23 will be discontinued and the attendant will invert the burner pan, thus causing the hot contents thereof to discharge into the space 13. Thus, the asphaltic constituents of the oil will drain from the inverted burner pan, and any tendency to form a crust in the pan will have been prevented by the automatic movement of the members 31, 32 upwardly as the pan is inverted.

The burner pan will be allowed to remain in this inverted position, while the heater is out of use, and it will be seen that rain will drain off of the bottom of the pan and will not enter the same and, thus, the interior of the pan will be maintained in a dry condition so that the heater will be immediately ready for operation, by simply righting the pan.

If desired, the members 31, 32 may be connected not only by the arm 33 but by webs 36 at intervals, thus insuring against relative bending between said members.

In this particular instance, the inner face of the rim of the pan wall 25, when the pan starts to tilt, first engages the arm 33 and swings said arm a slight distance and then the shoulder 28 engages the arm at a point nearer to the pivot 34 than is the point where the rim engages said arm. Thus at first greater leverage is exerted on the arm 33 to thrust the members 31, 32 through any obstruction, and then a quicker movement of the arm is promoted so as to swing said arm out of the path of the tilting burner pan.

I claim:

1. An orchard heater comprising a combustion chamber, a burner pan mounted in the combustion chamber, and a crust-breaking member mounted for movement in the pan.

2. An orchard heater comprising a combustion chamber, a burner pan movably mounted in the combustion chamber, and a crust-breaking member mounted for movement in the pan and operable by movement of the pan.

3. An orchard heater comprising a combustion chamber provided with an opening, a burner pan tiltably mounted in said opening, and a crust-breaking member mounted for movement in the pan and operable by tilting of the pan.

4. An orchard heater comprising a combustion chamber provided with an opening, a burner pan tiltably mounted in said opening, and a crust-breaking member pivotally mounted in the combustion chamber and projecting into the pan in position to be engaged and swung upwardly by the pan when the pan is tilted.

5. An orchard heater comprising a combustion chamber provided with an opening and with a flange surrounding the opening, said flange provided with air ports, an annular burner pan mounted in said opening, and a hollow support for the combustion chamber provided with air ports opening into the space beneath the burner pan.

6. An orchard heater comprising a combustion chamber provided with an opening, an annular burner pan provided with an air passage therethrough, pivots projecting from the outer wall of the burner pan and supported by the combustion chamber, and an annular flange projecting from the outer wall of the burner pan and substantially closing the upper end of the opening when the pan is level.

Signed at Los Angeles, California, this 1st day of November, 1926.

JOHN F. MAHLSTEDT.